United States Patent [19]

Pepper

[11] 4,425,678
[45] Jan. 17, 1984

[54] GAME SKINNING AID

[76] Inventor: Tony P. Pepper, Rte. 1, Box 237-E, Simsboro, La. 71275

[21] Appl. No.: 352,181

[22] Filed: Feb. 25, 1982

[51] Int. Cl.$^3$ .............................................. A22B 5/00
[52] U.S. Cl. ........................................ 17/44.2; 17/21; 294/79
[58] Field of Search ......................... 17/44.2, 44.3, 44; 294/74, 79; 248/317

[56] References Cited

U.S. PATENT DOCUMENTS 1,311,779 7/1919 Shank ..................................... 294/79
3,188,130 6/1965 Pietrowicz ........................... 17/44 X Primary Examiner—Willie G. Abercrombie
Attorney, Agent, or Firm—John M. Harrison

[57] ABSTRACT

A compact and portable game skinning aid designed to facilitate more efficient skinning of small game and fur-bearing animals, which includes a cable bar having a pair of internal cable guides communicating with each end of the cable bar, and a cable partially embedded in the cable bar with the cable ends slidably threaded back through the cable guides to define a loop at each end of the cable bar, the ends of the cable then attached to a mount bar positioned in spaced relationship with respect to the cable bar. In one embodiment of the invention an eye bolt is secured to the mount bar in order to suspend the game skinning aid from a secure mounting point, and the feet of a fur-bearing animal are positioned in the cable loops projecting from each end of the cable bar to secure the animal during the skinning operation. In another embodiment the ends of the cable are embedded in the cable bar and the game skinning aid is fitted with a lock bar which is slidably attached to the cable at a point where the cable exits the top of the cable bar, to maintain tension in the cable loops. A cable slide, which is slidably carried by the cable support above the lock bar, serves to create a support loop in the cable to suspend the game skinning aid from a support object in this embodiment of the invention.

5 Claims, 5 Drawing Figures

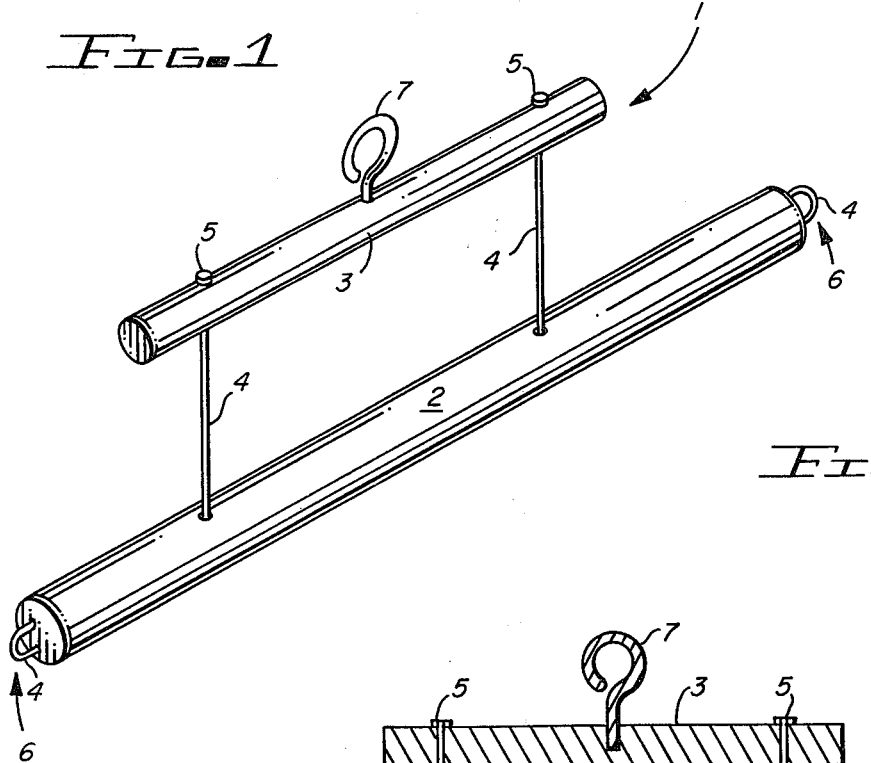
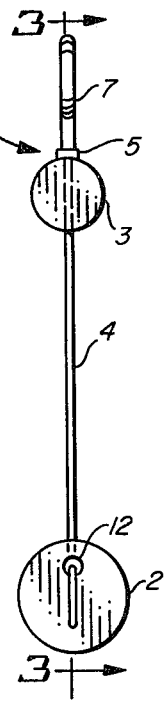
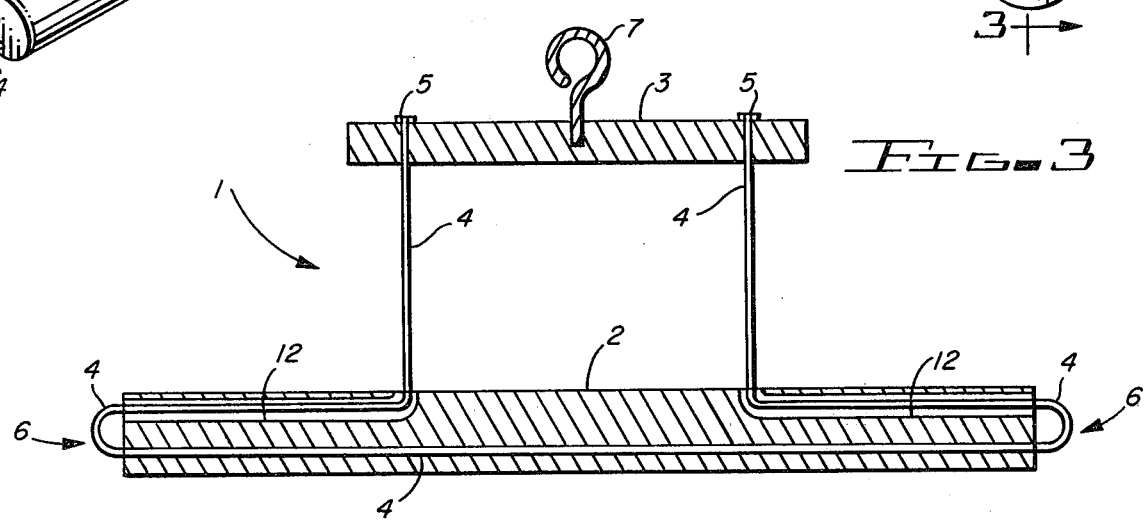
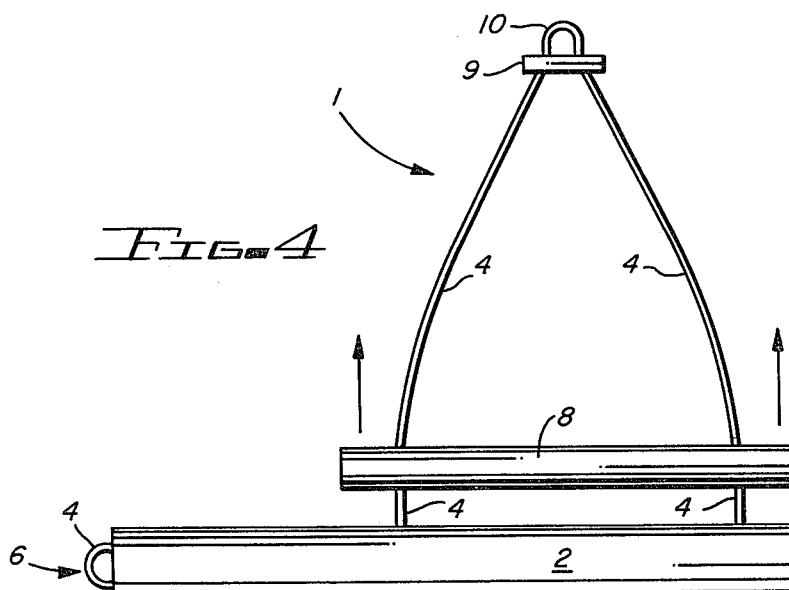
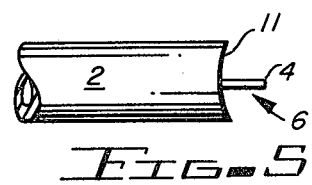

GAME SKINNING AID

BACKGROUND OF THE INVENTION

1. Field of the Invention

This invention relates to the skinning and dressing of game, and more particularly, to a compact, portable and operationally simple game skinning and dressing aid which can be used to quickly and easily support and skin or dress small fur-bearing animals. While the thrust of the invention is to provide a small, compact and portable game skinning aid, it will be appreciated by those skilled in the art that larger versions of the apparatus can be used to suspend and process large animals such as hogs and cattle, without departing from the spirit and scope of the invention. The game skinning aid of this invention operates by means of a flexible cable partially embedded in or otherwise attached to a cable bar, with a portion of the cable slidably looped through cable guides provided in each end of the bar, the cable further communicating with a mount bar located outside of the cable bar to tighten a pair of cable loops projecting from each end of the cable bar against the legs of an animal to aid in processing or skinning the animal, as may be required.

2. Description of the Prior Art

Many devices have been provided in the prior art for suspending animal and bird carcasses to facilitate carrying, dressing or skinning of the bird or animal. Among the simplest of these devices is the "Game Carrier" disclosed in U.S. Pat. No. 2,904,236, to J. A. Peterson, which coonsists of a segment of rope having slip-knots fashioned in each end for slipping around the necks of game birds such as ducks and geese, and transporting several of the birds at once. A "Self-Clamping Suspension" device is disclosed in U.S. Pat. No. 3,194,599, to Pierre Ambill, for suspending an animal carcass in an elevated head-down position, which device includes an oblong cage having a transverse strut and self-clamping shoes pivotally carried by the cage, the clamping shoes forming bearing jaws for clamping an animal's feet in the device when the animal is suspended from the device. Another suspension apparatus is disclosed in U.S. Pat. No. 1,311,779, to I. F. Shank. The Shank "Adjustable Hanger" is designed to suspend hogs for processing, and includes a pair of telescoping bars having a curved end and a pair of cables provided with loops extending through each curved end to engage the feet of a hog, the opposite end of the cables attached to a ring for suspending the hanger from a secure point. A "Small Game Hanging Device" is disclosed in U.S. Pat. No. 3,188,130, to S. P. Pietrowicz, which apparatus includes a hollow tube having a flexible thong or rope extending from each end through the tubes, and up through an aperture in the center of the tube to a point of suspension. The ends of the rope projecting from the tube are fitted with loops for engaging the legs of the animal to be suspended.

It is an object of this invention to provide a new and improved, portable and compact aid for skinning fur-bearing animals which includes a cable bar provided with a flexible cable, one portion of the cable being embedded inside the cable bar and extending from the ends of the cable bar to describe a loop at each end, and back through apertures in the cable bar and then from the cable bar to terminate in a mount bar fitted with a suspension means for hanging the game skinning aid from a suitable support.

Another object of this invention is to provide a game skinning and animal carcass suspension device which is characterized by a cable bar having the middle segment of a cable embedded therein or otherwise attached thereto, with the free ends of the cable projecting from the ends of the cable bar and threaded back through cable guides provided in the cable bar to define a pair of cable loops at each end of the cable bar, the ends of the cable then exiting the cable bar in spaced relationship and attached to a mount bar spaced from the cable bar, which mount bar is provided with means for suspending the game skinning device from a limb or other support.

Yet another object of the invention is to provide a game skinning and animal processing aid which, in a preferred embodiment, includes a cable bar having the ends of a cooperating cable secured therein, the cable extending from the ends of the cable bar, defining a loop at both ends, and extending through a pair of cable guides communicating from the ends of the cable bar to points intermediate the ends of the cable bar, the cable exiting the cable bar at these points in spaced relationship and extending through a lock bar which freely slides on the cable, to form a top loop shaped by a cable slide slidably positioned on the cable at a point above the lock bar.

SUMMARY OF THE INVENTION

These and other objects of the invention are provided in a game skinning aid which in one embodiment is characterized by a cable bar having the midsection of a flexible cable secured therein, with the ends of the cable extending from the ends of the cable bar and looped back through cable guides bored in the cable bar to define a pair of loops at the ends of the cable bar, the cables again exiting the cable bar at points intermediate the ends of the cable bar in essentially parallel relationship, and the ends of the cable then attached to a mount bar provided with a suspension means for suspending the game skinning aid. In another embodiment of the invention the ends of the cable in the game skinning aid are secured inside the cable bar, and the cable extends from the ends of the cable bar, back through the cable guides in the cable bar to define the cable loops, and slidably through a lock bar and a cable slide to define a support loop for hanging the game skinning aid in functional position.

BRIEF DESCRIPTION OF THE DRAWING

The invention will be better understood with reference to the accompanying drawing, wherein:

FIG. 1 is a front elevation of a preferred embodiment of the game skinning aid of this invention;

FIG. 2 is a side elevation of the game skinning aid illustrated in FIG. 1;

FIG. 3 is a sectional view, taken along lines 3—3 in FIG. 1, of the game skinning aid illustrated in FIG. 1;

FIG. 4 is a front elevation of another preferred embodiment of the game skinning aid; and FIG. 5 is a sectional view of one end of the cable bar of the game skinning aid, more particularly illustrating a preferred end configuration of the cable bar.

DESCRIPTION OF THE PREFERRED EMBODIMENTS

Referring to FIGS. 1 and 2 of the drawing, in a preferred embodiment of the invention the game skinning aid 1 includes a round cable bar 2, a cable 4 extending from each end of cable bar 2 to define a cable loop 6 at each end of the cable bar 2, and a mount bar 3, spaced from cable bar 2 and securing the ends of cable 4. In a preferred embodiment of the invention the ends of cable 4 are secured in mount bar 3 by means of cable stays 5, and an eye bolt 7 is attached to the center of mount bar 3 in order to suspend the game skinning aid 1 from a tree limb or other secure support for functional use.

Referring to FIG. 3, in yet another preferred embodiment the midsection of cable 4 is embedded or otherwise secured inside cable bar 2, and cable 4 extends from the ends of cable bar 2 and loosely back through cable guides 12, provided in cable bar 2, as illustrated. This looping of cable 4 shapes a cable loop 6 at each end of cable bar 2, and since the diameter of cable 4 is smaller than the diameter of cable guides 12, cable 4 can be slidably displaced inside cable guides 12 to control the size of each cable loop 6. In a most preferred embodiment of the invention the cable guides 12 extend from each end of cable bar 2 toward the center of cable bar 2, respectively, and terminate at openings in cable bar 2 which are short of the center of cable bar 2. Accordingly, the ends of cable 4 extend through cable guides 12 and exit cable bar 2 in spaced relationship to terminate in mount bar 3. It will be appreciated that the size of each cable loop 6 can therefore be adjusted by positioning mount bar 3 closer to or farther from cable bar 2 and sliding cable 4 inside cable guides 12, as hereinafter described.

Referring now to FIG. 4 of the drawing in another most preferred embodiment of the invention the game skinning aid 1 includes a cable bar 2 which is designed generally in the same manner as the cable bar 2 in FIGS. 1-3, except that the ends of cable 4 are embedded in or otherwise attached to cable bar 2, instead of the midsection of the cable 4. The cable 4 then extends from the ends of cable bar 2 to define a cable loop 6, and back through cable guides 12 and through a lock bar 8 and a cable slide 9 in slidable, spaced relationship, to further define a support loop 10, for suspending the game skinning aid 1 in functional position. Lock bar 8 can be slidably displaced on cable 4 to prevent cable 4 from sliding in cable guides 12 when cable loop 6 is adjusted to tighten on the feet of an animal, as hereinafter described.

In operation, and referring again to FIGS. 1-3 of the drawing, the eye bolt 7 of the game skinning aid 1 is attached to a substantial support such as a tree limb, and each cable loop 6 is then adjusted for size by sliding cable 4 through cable guides 12. Each foot of an animal to be dressed or skinned is then inserted through a cable loop 6, and the cable bar 2 is pulled downwardly to again cause cable 4 to slide in cable guides 12 and tighten each cable loop 6 around the feet of the animal. The game skinning aid 1 is now in functional position to support the animal, which can then be dressed or skinned quickly and easily, without the requirement of supporting the animal with the hands. Referring to FIG. 5 of the drawing, in yet another preferred embodiment the ends of cable bar 2 are shaped in a generally concave configuration to define a curved loop face 11, in order to better secure the feet of the animal to the cable bar 2 by each cable loop 6. The animal's legs can be released from each cable loop 6 by lifting the carcass, which removes tension from cable 4, and again pulling the cable 4 through cable guides 12 to enlarge each cable loop 6.

Operation of the game skinning aid 1 illustrated in FIG. 4 of the invention is implemented by initially suspending the skinning aid 1 by engaging the support loop 10 with a support means, and then adjusting the size of each cable loop 6 as heretofore described. A foot of an animal is then slipped through each cable loop 6, the cable bar 2 is then pulled downwardly to tighten each cable loop 6 on the feet, and the lock bar 8 is slipped downwardly on cable 4 to the position illustrated in order to bind cable 4 in cable guides 12, and prevent the cable 4 from slipping inside cable guides 12 to loosen either cable loop 6. The animal can then be dressed or skinned, as desired, with the hands free to accomplish either operation. The carcass is easily released by sliding lock bar 8 upwardly on cable 4, and then sliding cable 4 in cable guides 12 to open each cable loop 6 and remove the feet of the animal.

Referring again to FIG. 4 of the drawing, in another most preferred embodiment of the invention the apertures (not illustrated) in lock bar 8 are either in alignment with or outside of the outside edge of the openings defined by the terminus of the cable guides in the side surface of cable bar 2, in order to effectively bind the cable 4 when lock bar 8 is slidably disposed on cable 4 to the lock position illustrated.

It will be appreciated that the cable bar 2, mount bar 3 and lock bar 8 of the game skinning aid 1 can be manufactured of substantially any desired material, including plastic, fiberglass, and metal, such as steel, stainless steel and aluminum, in non-exclusive particular. Furthermore, the cable 4 is preferably formed of stainless steel strands, and in a most preferred embodiment, stainless steel strands encased in a plastic sheath. It will be further recognized that the cable bar 2, mount bar 3 and lock bar 8 can be fashioned from substantially any stock; however, in yet another preferred embodiment, the stock is round bar stock.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A game skinning aid for suspending animal carcasses comprising an elongated cable bar; a pair of cable guides extending from each end of said cable bar to points intermediate the ends of said cable bar, respectively; a cable extending through said cable guides and into said cable bar to define cable loops in said cable at said ends of said cable bar; a lock bar slidably disposed on said cable in spaced relationship with respect to said cable bar; and a cable slide slidably disposed on said cable above said lock bar to create a support loop in said cable.

2. The game skinning aid of claim 1 wherein said points intermediate the ends of said cable bar are located between said ends of said cable bar and the center of said cable bar, respectively.

3. The game skinning aid of claim 1 wherein said cable bar and said lock bar are shaped from round bar stock and said cable is stainless steel having a plastic coating.

4. The game skinning aid of claim 1 wherein said points intermediate the ends of said cable bar are located between said ends of said cable bar and the center of said cable bar, respectively, and said cable bar and said lock bar are shaped from round bar stock and said cable is stainless steel having a plastic coating.

5. The game skinning aid of claim 4 further comprising vertically concave surfaces in the ends of said mount bar adjacent said cable loop.

* * * * *